May 16, 1933.  W. C. CARPENTER  1,908,689
METHOD OF PRODUCING CARBONIZED FUEL BRIQUETTES
Filed Jan. 30, 1929
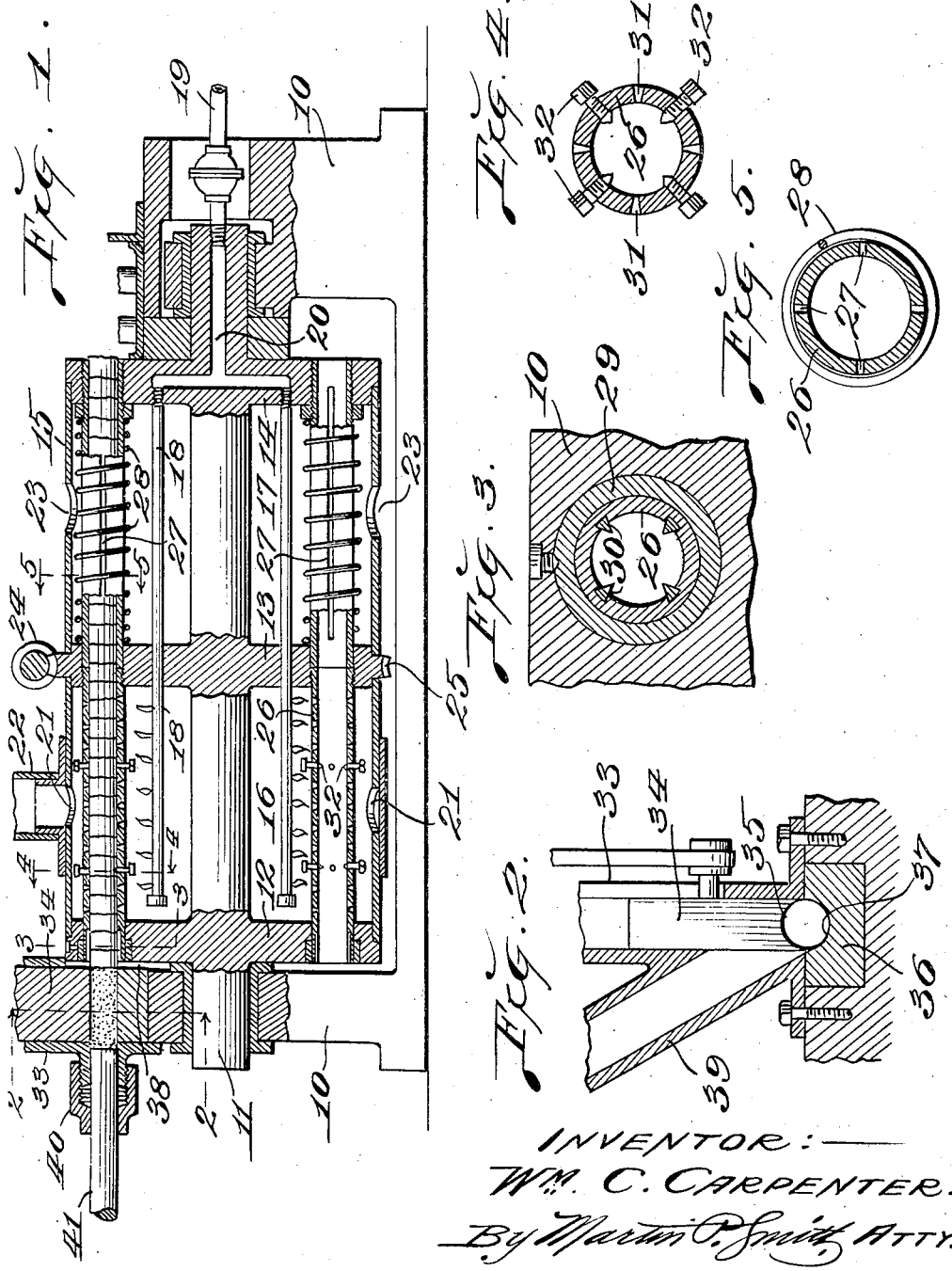
INVENTOR:—
WM. C. CARPENTER.
By Martin P. Smith, Atty.

Patented May 16, 1933

1,908,689

UNITED STATES PATENT OFFICE

WILLIAM CLARENCE CARPENTER, OF SAN FRANCISCO, CALIFORNIA

METHOD OF PRODUCING CARBONIZED FUEL BRIQUETTES

Application filed January 30, 1929. Serial No. 336,258.

My invention relates to a method of producing carbonized fuel briquettes, and the method herein disclosed is an improvement on a similar method set forth in an application for U. S. Letters Patent filed by me November 23, 1925, Serial Number 70,869.

The principal objects of my present invention are to generally improve upon and simplify the method set forth in my aforesaid patent application and to provide a relatively simple and easily produced method whereby the briquettes may be produced from comminuted vegetable matter such as sawdust, wood shavings and the like and in which practice certain elements in the materials from which the briquettes are formed provide the necessary binding element, thereby doing away with the requirement and use of an extraneous binder.

Further objects of my invention are to provide an improved method of forming comminuted vegetable matter into relatively hard briquettes having uniform density throughout their bodies and further to provide a method of baking the briquettes or subjecting the same to heat while they are in the molds or forms for the purpose of searing or charring the surfaces of the briquettes, thereby forming a relatively hard carbonaceous crust that serves as a protection for the greater portion of the material forming the bodies of the briquettes and enabling the same to be readily handled during storage, transportation and the like without fracture or breakage, and without disintegration due to varying climatic conditions.

A further object of my invention is to provide an improved method whereby with one operation dry comminuted carbonaceous material is delivered into a feeding and compressing chamber, forcing the material from said chamber through a forming die into a baking chamber, subjecting said material to heat sufficient to carbonize the same and form on the surface thereof a carbonaceous crust, then passing the formed and baked briquette into a cooling chamber, and finally discharging the cooled briquette from the baking chamber onto a conveyer that delivers the briquettes into a suitable bin or container.

A further object of my invention is to provide an improved method that will enable a relatively large tonnage or output of briquettes to be produced within a given time and which briquettes when formed and baked are ready for use or if desired the briquettes may be stored for an indefinite period of time due to the formation of the moisture-proof carbonaceous crusts on the surfaces of the briquettes.

In the drawing forming a part of this specification, I have illustrated one practical form of apparatus that may be advantageously employed in practicing my improved method and in the drawing, Fig. 1 is a vertical longitudinal section taken through the center of the apparatus.

Fig. 2 is an enlarged vertical section taken approximately on the line 2—2 of Fig. 1.

Fig. 3 is an enlarged detail section taken on the line 3—3 of Fig. 1.

Fig. 4 is an enlarged cross section taken approximately on the line 4—4 of Fig. 1.

Fig. 5 is an enlarged cross section taken on the line 5—5 of Fig. 1.

Referring by numerals to the accompanying drawing, 10 designates a suitable frame or base that is provided at its ends with bearings for the ends of a shaft 11 and formed on or fixed to said shaft between the bearings are spaced disks 12, 13 and 14 and secured to the edges of these disks is a shell 15, preferably of heavy sheet metal.

The space 16 between the disks 12 and 13 constitutes a heating chamber and space 17 between the disks 13 and 14 constitutes a cooling chamber.

The chamber 16 is heated by means of gas jets from tubes 18 that enter said chamber, and which tubes are supplied with gas from a pipe 19 that leads to a duct 20 that is formed in one end of shaft 11, and said duct being provided with branches that lead to the tubes 18.

Heating chamber 16 is provided with a series of outlet openings 21 that communicate with a stationary outlet 22 at the top of the apparatus and formed in the wall surrounding the cooling chamber 17 are openings 23 through which air may be circulated to exert a cooling effect.

The drum comprising the disks 12, 13 and 14 and the shell 15 may be rotated in any suitable manner, for instance by means of a worm 24 that engages the teeth of a worm wheel 25, the latter being formed on the periphery of disk 13.

Extending longitudinally of the drum and passing through the disks 12, 13 and 14 is a series of tubes 26, the axes of which are parallel with the axis of shaft 11 and those portions of the tubes that extend through the heating chamber 16 function as baking dies for the briquettes passing therethrough and those portions of the tubes that pass through the cooling chamber 17 function as holders for the briquettes while the same are being cooled.

Those portions of the tubes that pass through the cooling chamber 17 are slotted longitudinally, as designated by 27 in order that these portions of the tubes may expand slightly to relieve pressure on the briquettes that are passing therethrough and surrounding these slotted portions of the tubes are coils 28 of wire which yieldingly resist the expansive movement of the slotted portions of the tube.

Surrounding the ends of the tubes 26 that are seated in disk 12 are collars 29 and seated in the inner faces of the tubes at their inlet or forward ends are short longitudinally disposed metal bars 30 that are substantially V-shaped in cross section and the pointed portions of which project inwardly beyond the inner surfaces of the tubes.

Formed through those portions of the tubes 26 that pass through the heating chamber 16 are outlet apertures 31 that permit the escape of gases and volatile matter that is expelled from the briquettes while the same are being baked and these outlet apertures are relatively small at their inner ends and gradually increase in diameter toward their outer ends (see Fig. 4).

Seated in those portions of the tube 26 that pass through the heating chamber 16 are screws 32 having pointed inner ends that project into the openings through the tubes and these screws are in longitudinal alignment with the V-shaped members 30 that are seated in the inlet ends of the tubes.

Mounted on the bearing 10 at the front of the apparatus is a housing 33 and arranged for vertical reciprocating movement therein is a combined feeding and forming die 34, the latter being provided in its lower face with a semi-circular recess 35.

Seated in the top of the front bearing 10 is a plug 36 provided in its upper face with a semi-circular recess 37, and the recesses 35 and 37 combined provide a forming chamber within which the briquettes are precompressed and formed.

Housing 33 is constructed so that its inner portion is spaced a slight distance away from the outer face of the front disk 12, and this space permits the ready escape of air from the material that is precompressed within the chamber comprising the recesses 35 and 37. This relatively narrow air-escape space is designated by the numeral 38.

Leading to the side of the housing 33 is an inclined chute 39 which delivers the comminuted material that is formed into briquettes by my improved method.

Formed on the outer wall of the housing 33 is a stuffing box 40 and arranged for reciprocatory movement therethrough is a plunger 41 that is adapted to pass through the precompression and forming chamber comprising the recesses 35 and 37.

In practicing my improved method with the form of apparatus illustrated and just described, the drum is intermittently rotated and at each stop or period of rest one of the longitudinally disposed tubes 26 occupies a position in longitudinal alignment with the briquette forming chamber between the dies 34 and 36, and when one of the tubes is brought to this position plunger 41 is retracted and die 34 is elevated, thereby permitting a charge of comminuted vegetable substance to discharge through chute 39 into the pre-compression and forming chamber between the dies 34 and 36.

Plunger die 39 now moves downward until its lower end is positioned directly above fixed die 36, thereby compressing to a certain degree the charge of material in the precompression chamber and the air that is expelled during this pre-compression passes out through space 38.

The plunger 41 is now moved inwardly, thereby imparting longitudinal pressure to the precompressed charge between the dies 34 and 36 and the briquette thus formed is forced into the receiving end of the tube that is in longitudinal alignment with the precompression chamber and the plunger.

As the newly formed briquette is thus compressed and forced into the end of the tube those briquettes that were previously formed and which occupy the tube will be forced lengthwise a short distance therethrough, or the distance equal to the thickness of the last formed briquette, and the friction arising from the contact between the briquettes within the tube and the wall of the latter provides resistance to the last formed briquette that is forced into the tube and thus said briquette will be compressed to a relatively high degree of density.

As the briquettes are thus formed and forced into the tubes, air that is expelled by the pressure will pass outwardly through the space 38 and as the briquette passes through the inlet end of the tube the V-shaped members 30 will form corresponding grooves in the perforations of the briquettes, which grooves enable the gases and volatile matter to escape from the briquettes while they are being baked.

The gases and volatile matter that are expelled from the briquettes during baking operations pass outwardly through the tapered apertures 31 and discharge with the heat that leaves the baking chamber and as the briquettes pass through the perforated portions of the tubes that extend through the baking chamber the pointed ends of the screws 32 pass through the V-shaped grooves in the perforations of the briquettes, thereby tending to clean the same and permit free escape of the gases and volatile matter that are expelled during the baking operation.

During the briquette baking operation resin, creosote, methyl, acetate, acetate of lime and like elements from the wood or material from which the briquettes are formed will, due to combined heat and pressure, be forced to the surfaces of the briquettes and particularly those surfaces in contact with the tubular dies through which the briquettes are intermittently forced and as a result the surfaces of the briquettes will be very thoroughly carbonized and charred, thereby forming a practically solid shell or crust around the peripheries of the briquettes so that the same may be readily handled when discharged from the machine and, further, the briquettes having the crusted surfaces will not tend to deteriorate under different atmospheric changes while said briquettes are in storage.

After the carbonized briquettes have been formed and baked, they will pass into and through those portions of the tubes that occupy the cooling chamber 17, and after passing therethrough said briquettes will discharge into a suitably arranged conveyer at the rear end of the machine and this conveyer will discharge the briquettes into a suitable bin or container.

In order to achieve the best results I prefer to dry the comminuted vegetable material before the same is delivered to the chute 39 and I have found in tests and experiments that this pre-drying of the material eliminates practically all of the moisture from said material and much of the air so that the material may be worked and handled to much better advantage when formed and pre-pressed between the dies 34 and 36 and then forced into the baking dies or tubes that extend through the baking chamber.

Briquettes formed by my improved method have uniform density throughout their bodies, they are practically free of air pockets, and the crusts formed on the surfaces of the briquettes impart to the bodies thereof sufficient strength to withstand rough handling during transportation.

Thus it will be seen that I have provided a relatively simple and easily practiced method for very rapidly and economically producing carbonized fuel briquettes from comminuted vegetable materials.

I claim as my invention:

1. The herein described method of producing carbonized fuel briquettes, which consists in predrying comminuted vegetable material, then molding predetermined quantities of said predried material to form briquettes, forming grooves in the peripheries of the briquettes simultaneously with the molding thereof, which grooves permit the escape of air and a volatile matter from the material within the bodies of the briquettes when the same are further compressed and heated, then simultaneously compressing the briquettes and subjecting the same to heat so as to force the resin, creosote, methyl acetate and the like to the surfaces of said briquettes to form carbonized crusts on said surfaces and to thoroughly carbonize the bodies of said briquettes within the carbonized crusted surfaces thereof and at the same time removing all accumulations from the grooves in said briquettes and maintaining said grooves in a clean condition while subjected to heat and pressure in order to permit the ready escape of air and volatile matter from the interior of the bodies of the briquettes.

2. The herein described method of forming fuel briquettes from comminuted vegetable material which consists in molding predetermined quantities of the material into briquettes of substantially uniform size forming grooves in the surfaces of said briquettes at the time they are molded, then subjecting the formed briquettes to the simultaneous action of heat and pressure to drive the resin, creosote, methyl acetate and the like from the bodies of the briquettes to the peripheral surfaces thereof and form carbonized crusts on said surfaces maintaining the grooves in said briquettes clean and devoid of accumulations while said briquettes are subjected to heat and pressure and at the same time uniformly carbonizing the bodies of the briquettes within the crusted surfaces thereof.

3. The herein described method of forming fuel briquettes from comminuted vegetable material which consists in molding predetermined quantities of the material into briquettes of substantially uniform size forming grooves in the surfaces of said briquettes at the time they are molded, then subjecting the formed briquettes to the simultaneous action of heat and pressure to drive the resin, creosote, methyl acetate and the like from the bodies of the briquettes to the peripheral surfaces thereof and form carbonized crusts on said surfaces maintaining the grooves in said briquettes clean and devoid of accumulations while said briquettes are subjected to heat and pressure and at the same time uniformly carbonizing the bodies of the briquettes within the crusted surfaces thereof and then cooling the carbonized crusted surface briquettes.

4. The herein described method of forming fuel briquettes from comminuted vegetable material which consists in molding predetermined quantities of the material into briquettes of substantially uniform size, forming grooves in the peripheral surfaces of the briquettes at the time they are molded, which grooves permit the escape of air and volatile matter from the material forming the bodies of said briquettes when the same are later subjected to heat and pressure, then subjecting the formed briquettes to the simultaneous action of heat and pressure to drive the resin, creosote, methyl acetate and the like from the bodies of the briquettes to the peripheral surfaces thereof and form carbonized crusts on said surfaces maintaining said grooves in a clean condition and devoid of accumulations during the time the briquettes are subjected to heat and pressure and at the same time uniformly carbonizing the bodies of the briquettes within the crusted surfaces thereof.

In testimony whereof I affix my signature.

WILLIAM CLARENCE CARPENTER.